United States Patent [19]
Bruce

[11] Patent Number: 5,097,787
[45] Date of Patent: Mar. 24, 1992

[54] TENSIONING DEVICE

[75] Inventor: Peter Bruce, Isle of Man, Isle of Man

[73] Assignee: Brupat Limited, Isle of Man, Isle of Man

[21] Appl. No.: 473,995

[22] PCT Filed: Oct. 21, 1988

[86] PCT No.: PCT/GB88/00913

§ 371 Date: May 23, 1990

§ 102(e) Date: May 23, 1990

[87] PCT Pub. No.: WO89/03786

PCT Pub. Date: May 5, 1989

[30] Foreign Application Priority Data

Oct. 27, 1987 [GB] United Kingdom ............... 8725126
Jan. 12, 1988 [GB] United Kingdom ............... 8800593
Apr. 15, 1988 [GB] United Kingdom ............... 8808948

[51] Int. Cl.$^5$ ............................................. B63B 21/24
[52] U.S. Cl. ................................................. 114/293
[58] Field of Search ............ 114/230, 199, 200, 293, 114/294, 297, 270, 210; 43/17.2; 24/116 R

[56] References Cited

U.S. PATENT DOCUMENTS 2,448,482 8/1948 Woolslayer et al. ............ 24/116 R
3,386,407 6/1968 Mount .............................. 114/206
4,090,462 5/1978 Mount .............................. 114/293
4,727,819 3/1988 Pollack ............................. 114/230
4,889,065 12/1989 Vanden Haak .................. 114/293

FOREIGN PATENT DOCUMENTS 0194717A 9/1986 European Pat. Off. .

Primary Examiner—Edwin L. Swinehart
Attorney, Agent, or Firm—Mason, Fenwick & Lawrence

[57] ABSTRACT

There is provided a tensioning device for pretensioning mooring lines in accordance with the tension-in-a-bight principle. The tensioning device is located at the bight of the mooring lines and includes a link catching device comprising inclined land surfaces and a catching tooth at the lower end of the land surfaces, which catching device catches a link, the caught link, of link chain during heaving up on a riser chain section so enabling the pretensioning to be achieved in the mooring line. Slots are provided in the tensioning device adjacent the land surfaces such that the downline link threading the caught link and the following downline link each have a significant degree of pivotal freedom to preclude bending moment loading in these links during heaving up on the riser line during tensioning.

18 Claims, 5 Drawing Sheets

TENSIONING DEVICE

The present invention relates to a tensioning device for pretensioning spread mooring line systems having spaced opposed anchor members lodged in a mooring bed and anchor cable means connected to each anchor for attachment to a vessel or other floating marine structure to be moored. It is to be understood that the term "cable" covers link chain cable in addition to wire cable and, indeed, all line constructions equivalent to such wire and chain cables.

It is present practice to pretension the cables of such mooring line systems to set the ground-engaging portions of the cables into the soil when the anchor members comprise driven piles and, additionally, to cause penetration of the anchor members themselves when the anchor members comprise drag embedment fluke anchors. A common method of pretensioning involves simply hauling in on opposed cables using a winch mounted on a floating vessel. This has the disadvantage of requiring a large and costly high-powered winch when large anchor members are deployed. This disadvantage can be mitigated substantially by adopting a method involving the well-known tension-in-a-bight purchase principle wherein an increment of tension applied to a first cable attached at right angles to the middle of a stretched second cable deflects it and so induces an increment of tension in the second cable which by resolution of forces, may be several times greater than that applied to the first cable. The component of tension at right angles to the first cable that is induced in the second cable is equal to the tension in the first cable divided by twice the tangent of the angular deflection of the second cable at the attachment point. Thus, the power and cost of the tensioning winch required to pretension a mooring line system may be reduced greatly by pulling vertically on a riser cable attached at a joining point between two lengths of anchor cables stretched out horizontally over a mooring bed between two anchor members to benefit from the multiplication of tension obtained from the tension-in-a-bight purchase principle.

It is an object of the present invention to provide an improved tensioning device for pretensioning mooring line systems when using the tension-in-a-bight purchase principle.

According to the present invention there is provided a tensioning device for use in pre-tensioning at least first and second cables of a mooring line system when the device is attached thereto, at least one of the cables including link chain cable, the tensioning device comprising a body member including at least first and second cable holding means, and passage means located between the cable holding means to enable the one cable including link chain to pass through the body member to define a riser cable portion, at least one of the cable holding means comprising releasable catch means for engaging the link chain cable, the releasable catch means being arranged such that a link, referred to as the caught link, of the link chain cable extending through the passage means is caught by the releasable catch means when the riser portion is tensioned and released from the releasable catch means when the riser portion is relaxed, the body member including structure defining slot and clearance means in the body member whereby when the caught link is engaged by the releasable catch means during chain tensioning a downline chain link threading the caught link and a following link can move into the slot and clearance means, and the downline chain link can swing to form an angle in the range 0° to 27° with a plane containing a line connecting the first and second cable holding means, defined as the cable holding means connecting line, without a portion of the body member contacting the downline chain link.

Preferably the body member includes land surface means adapted to support only said caught link of link chain adjacent said releasable catch means, and preferably said land surface means support the caught link in a plane inclined at an acute angle to the horizontal when the caught link (L1) engaged by the catch means during chain tensioning, the acute angle facing the axis of the riser portion.

Preferably means are provided for the attachment of a pendant line to the body whereby the catch means are released on heaving up on the pendant line.

Embodiments of the present invention will now be described by way of example with reference to the accompanying drawings wherein.

Figure 1:
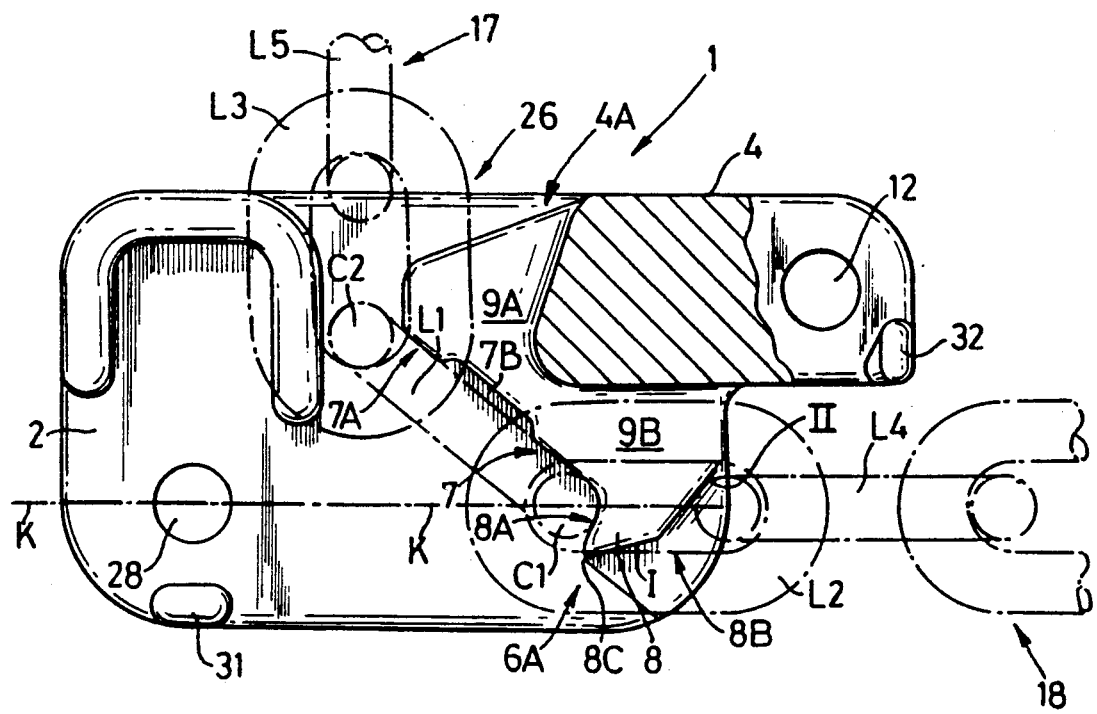
FIG. 1 is a sectional side elevation of a tensioning device through section M—M in FIG. 3 for tensioning anchor chains, in accordance with the present invention.
Figure 2:
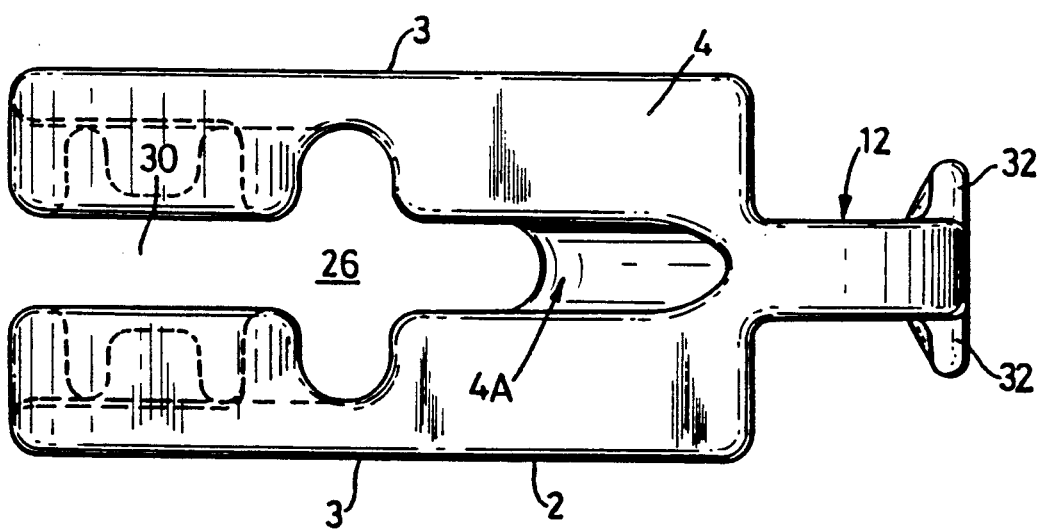
FIG. 2 is a plan view of the device in FIG. 1.
Figure 3:
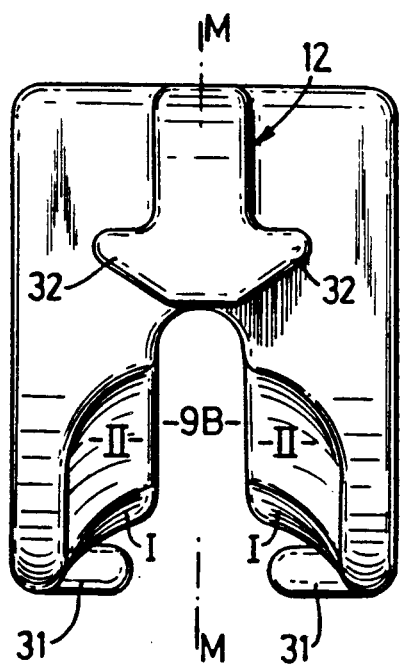
FIGS. 3 and 4 are end views looking in the directions of A and B respectively.
Figure 4:
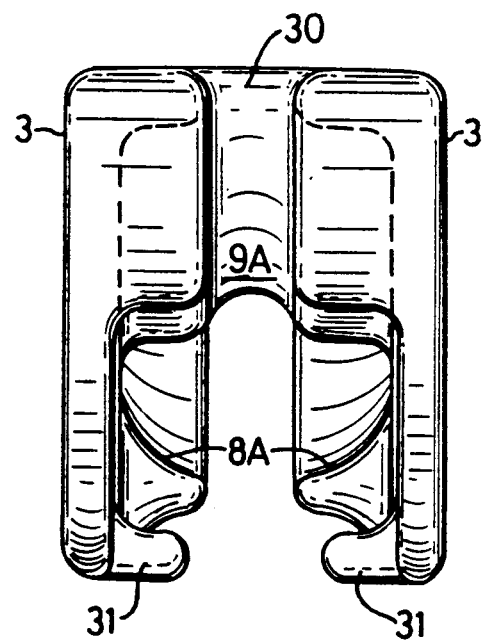

Referring especially to FIGS. 1 to 5, a mooring line tensioning device 1 serves for tensioning opposed anchor chains 18, 19 (see FIG. 6A) to the outer ends of which chains individual anchors (not shown) are attached, the device 1 comprising a body member 2 generally of block form having side walls 3 and a transverse portion 4. The transverse portion 4 includes releasable link catch means 6A in the form of a clutch device to catch a link of the chain defined by chain portion 18 and a riser chain portion 17, while aligned holes 28 in the side walls 3 spaced from catch means 6A serve to receive a shackle pin for pivotally securing the anchor chain 19 to the device 1. A passage means 26 for the chain riser portion 16 is located between the catch means 6A and the shackle receiving holes 28.

A connecting straight line K—K joins the two chain holding means defined by catch means 6A and shackle holes 28; more specifically line K—K passes through the centre of holes 28 and through the centre of the crown CI of the caught link LI caught by the catch means 6A, said crown CI being engaged by the catch means 6A. In the FIG. 7 embodiment a further releasable catch means 6B is present replacing shackle holes 28) and located oppositely to the catch means 6A, and in this case the connecting line K—K passes through the centres of the caught link crowns CI associated with the respective catch means 6A, 6B. The connecting line K—K defines the term "cable holding means connecting line" and the line is horizontal in FIGS. 1 and 6A.

Figure 5:
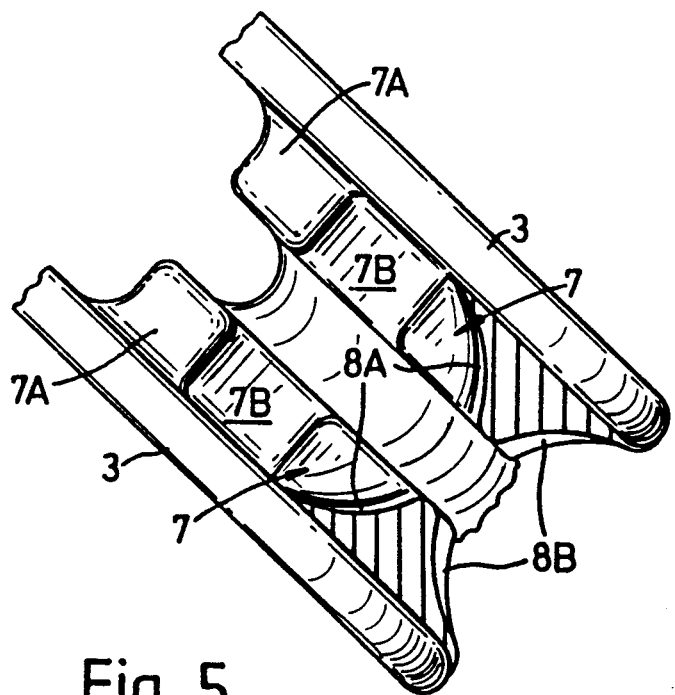
FIG. 5 is a view in the direction C, i.e. onto land surfaces of the device for a caught-link.
Figure 6A:
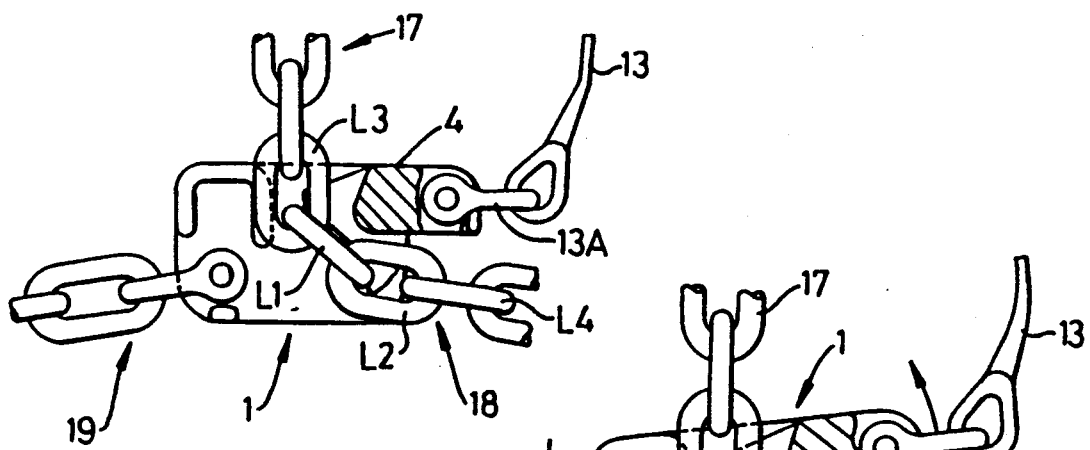
FIGS. 6A–6H show a series of sectional side elevational views of the device illustrating various operational stages.

The catch means 6A is in the form of a tooth 8 having a front surface 8A and a back surface formed by a clearance 8B in the body member 2, and land surfaces 7 are provided before the tooth 8 to support a link LI (referred to as the caught link) the land surfaces 7 forming a pocket formation with portions of the side walls 3 and tooth 8 (see FIG. 5). The catch means 6A lock onto the caught link LI with the tooth front surface 8A bearing against the adjacent crown of the caught link LI. A slot is provided between the surfaces 7 for passage of chain links positioned in a vertical plane (referred to as vertical links), the caught link LI threading vertical links.

The land surfaces 7 have support surface portions 7A which support the caught link LI adjacent the crown C2 remote from the tooth 8; and the surfaces 7 further include recesses 7B to accommodate weld joins in the chain links and so avoid the caught link being bent by pressure on protruding weld metal. For effective operation of the device 1 the land surfaces 7 are inclined at an acute angle to the cable holding means connecting line K—K, and it has been found that the preferred acute angle lies in the range 30° to 70° with 35° to 45° preferred. In this example the acute angle is about 40°.

The body 2 is configured, i.e. provided with a deep clearance slot 9B, so that the down-line vertical link L2 threading caught link L1 can swing to form an angle of 27° or less with the line K—K without a portion of the body member 2 contacting link L2: in this example the link L2 can in fact swing to be aligned with line K—K i.e. form a zero angle. Further, the body clearance 8B (i.e. tooth back surface) is such that with the link L1 caught by catch means 6A, link L4 threading vertical link L3 (as shown in FIG. 1) can swing to the same angle as link L3 without contacting a portion of the body member 2 above chain link L4. A further slot 9A at the upline end, enables vertical link L3 to swing freely to the upright position as shown, the links L3 forming part of the riser portion 17 of the anchor chain 18.

The passage 26 is in the form of a slotted guide means which serves to orientate chain passing therethrough so that a non-vertical link is positioned for ready engagement by the catch means 6A and support by surfaces 7 i.e. to serve as a caught link L1. As can be seen in the plan view shown in FIG. 2 the slotted guide means have a cruciform cross section. The body member 2 further includes a slot 30 to enable the device 1 to be fitted onto the anchor chain 17, 18. In this example, the tooth front surface 8A is preferably inclined at an angle in the range of 90° to 120° to the surfaces 7, and more especially in the range 96° to 114°, to enable the caught link L1 to swing easily away from the catch means 6A when the chain 17, 18 is relaxed as will be explained later.

To enable the catch means 6A to be freed from the caught link L1, a hole 12 is provided for a shackle 13A of a pendant linke 13, and the hole 12 is positioned to provide an appropriate lever arm for the pendant line 13 whereby the catch means 6A is tripped out of catching engagement with the caught link L1 on heaving up on the pendant line 13. In particular, the hole 12 is spaced appropriately from the surface portion 7A to provide the desired lever arm. Ears 31 are provided on the body member 2 below the holes 28 to prevent excessive downward swinging of the shackle attaching chain 19 but in practice excessive downward swinging of chain 19 is unlikely to occur. Further, stop elements 32 on the body member 2 serve to limit the downward swing of the pendant shackle 13A.

The transverse portion 4 is cut away at 4A to enable the links L3 and L5 to swing adequately to the right (as shown in FIG. 1) to enable a vessel to ride at long scope when pulling through the anchor chain 19 with the riser portion 17 fairly substantially inclined from the vertical subsequent to completion of the tensioning operation.

Figure 6B:
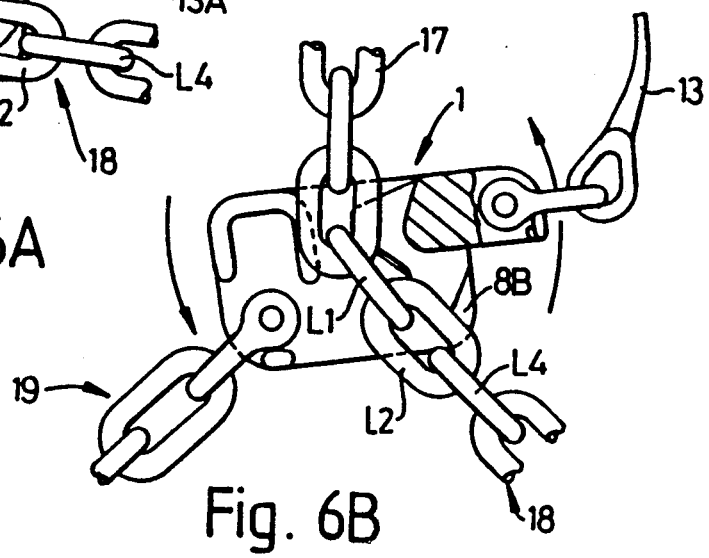
Figure 6C:
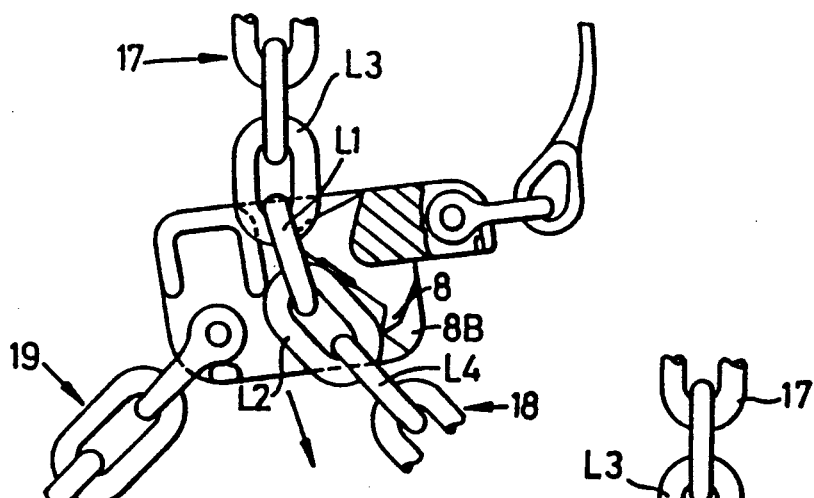

To tension mooring chains 18, 19 utilising the device 1, a first anchor is first laid on the sea bed, say that connected to chain 17, 18, and the device 1 can then be fitted to this chain 17/18. With the chain 19 (complete with second anchor) now fitted to the device 1 by means of holes 28, the device 1 can be lowered down riser chain 17 utilising pendant line 13 to enable positioning of the second anchor on the sea bed and stretching out of chains 18/19—the situation is now essentially as shown in FIG. 6F with the link LI in contact with land surfaces 7.

To effect the tensioning operation the riser chain 17 is heaved vertically and this vertical heaving on the riser chain 17 (FIG. 6A) keeps the caught link L1 firmly locked against the land surface 7 and against the tooth 8 and induces a horizontal component of tension in each of chain legs 18, 19 equal to the vertical riser tension divided by twice the tangent of the angle of inclination of link L2 to the horizontal. This horizontal component of tension, reaching as high as 6 times the riser chain tension for 4.76° inclination of link L2 to the horizontal (line K—K), is available for setting the ends of chain legs 18, 19 and anchors attached thereto into the sea bed. A very considerable mechanical advantage is thus present at low angles of inclination of link L2 which decreases below unity when the angle of inclination of link L2 is as high as 26.6°.

As device 1 is raised progressively higher above the sea bed, the induced horizontal tensions in chain legs 18, 19 cause movement of the anchors or burial of the chain ends which relax the chains and limit the horizontal tensions to a maximum peak value which, when reached, denotes completion of the first heave of the tensioning operation.

On completion of the first heave, paying out the riser chain 17 (FIG. 6B) now reduces the tension in all three chain legs 17, 18, 19. As the tension decreases each of the lower chain legs 18, 19 sags to a progressively larger angle to the horizontal whilst the tensioner rotates about a pivotal curved surface at the upper edge of the land surface 7 supporting the caught link. This causes the caught link LI, the next lower link L2 threaded through it, and the next again link L4 to rotate relative to the tensioner I until the catch means 6A are disengaged completely from the chain links.

Further paying out of the riser chain 17 (FIG. 6C) causes the inclination of the caught link L1 to increase until the tensioner 1 slides downwards along it, gathering momentum on the way.

Figure 6D:
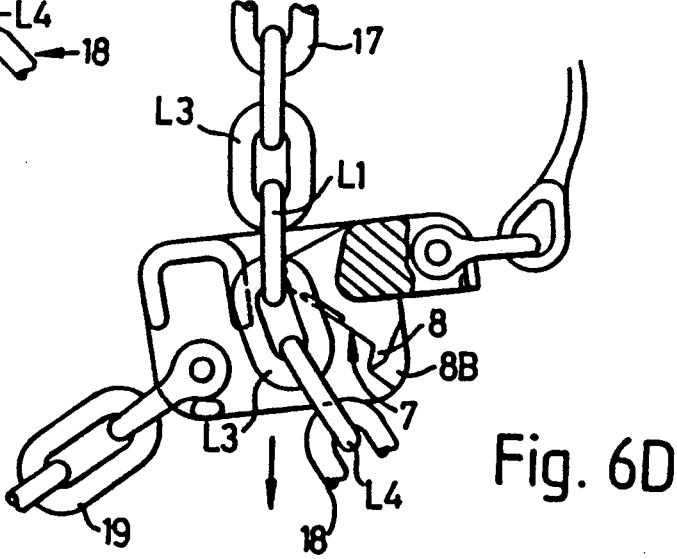

In FIG. 6D downwards movement of the tensioner 1 has brought the caught link L1 in line with the vertical riser leg of chain 17.

Figure 6E:
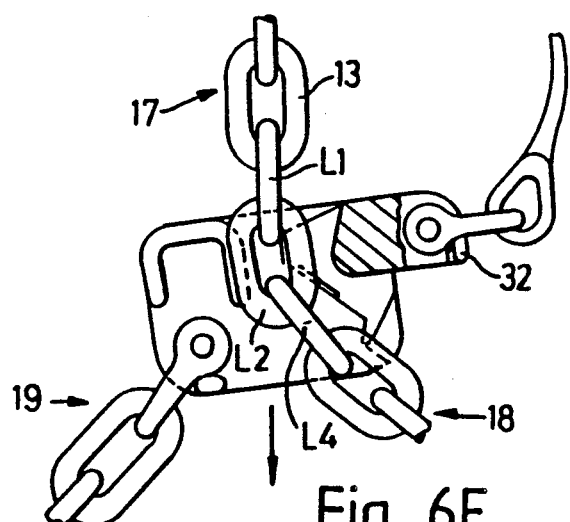
Figure 6F:
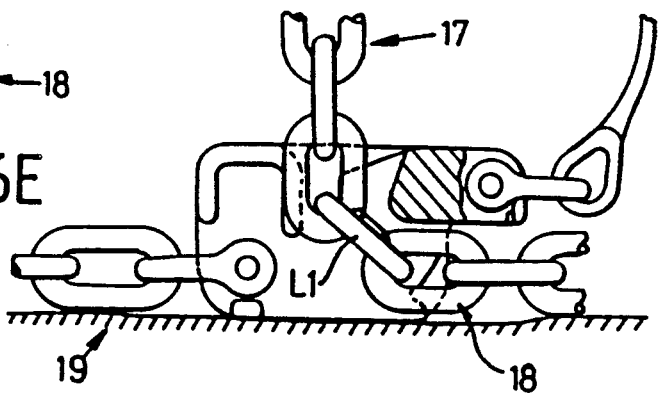

The tensioner 1 then falls (FIG. 6E) further until the pivotal surface makes contact with the second link L4 below the caught link whereupon the sequence of FIGS. 6A to 6D is repeated.

In the above manner, the tensioner 1 cascades down the chain to the sea bottom (FIG. 6F) where its weight produces a small tension in the chains enabling a fresh link to be caught against land surface 7 and the catch means 6A. Heaving can now be commenced again to establish a new peak horizontal component of tension obtained in each of the lower legs of the chains with further movement of the anchors or embedment of the chain ends occurring. These heaving cycles are repeated until the peak horizontal component of tension in chains 18, 19 achieved per heave increases to equal the tension desired.

Figure 6G:
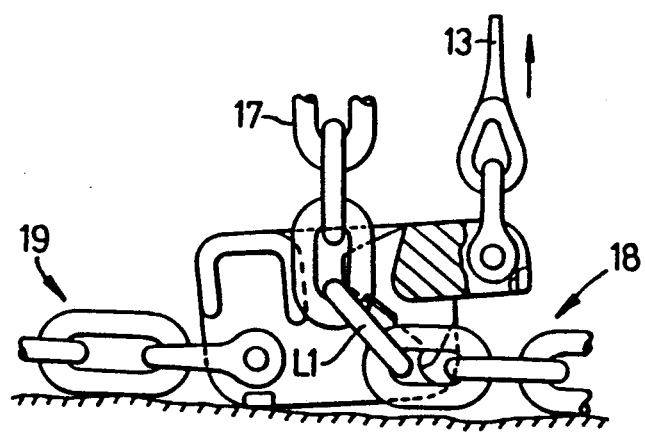

When the heaving cycles of FIGS. 6A to 6F have been completed and the tensioner has returned to the position shown in FIG. 6F, heaving up on the pendant line 13 while keeping the riser chain 17 slack rotates the tensioner on the caught link L1 and disengages the catch means 6A from the crown C1 of the caught link L1 (shown in FIG. 6G).

Figure 6H:
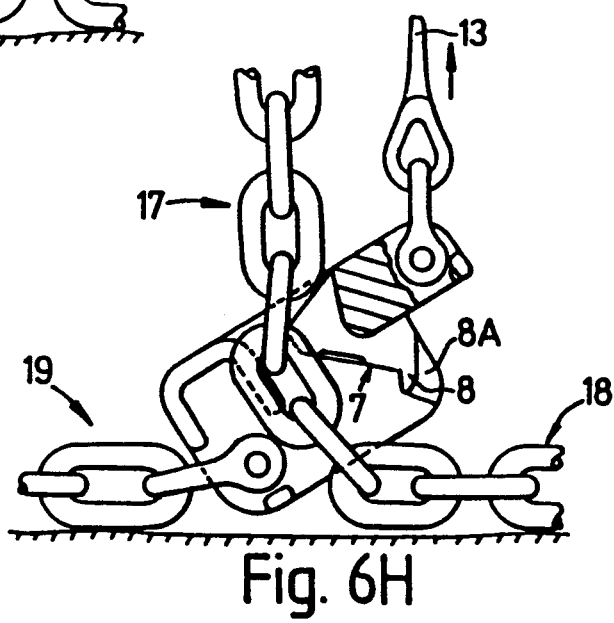

Further heaving on the pendant line 13 (FIG. 6H) hauls the tensioner 1 up the slack riser chain for recovery and removal from the riser chain 17.

If the device 1 utilises land surfaces 7 which are set at a greater angle to the line K—K, in particular greater than 50°, and/or where a lower frictional factor is present on a pivotal curved surface at the upper end of land surface 7 the operation of the device may be somewhat different. Thus, instead of the swinging motion between the device 1 and the links L1, L2 and L4 as shown in FIG. 6B, in this case the device may simply slide over the link L1 to bring the tooth back surface 8B into contact with the upstream crown of the link L4. For this situation, the back surface 8B requires to be adapted so that it can push aside the link L4 to enable continued downward movement of the device 1. Thus in FIG. 1, for this requirement, the back surface 8B has an outer portion I adjacent the crown 8C of tooth 8 which is inclined with a downward opening angle to land surfaces 7 in the range 40° to 80°. A preferred range is 47° to 57°; the latter value being specifically used in FIG. 1. The surface 8B has a further portion II following portion I which is at an angle to portion I to allow the required swinging motion of link L4.

Essentially the above preloading operation is achieved by utilising the known tension-in-a-bight purchase technique, the resisting horizontal component of tension in the chain sections being greater than in the riser section 17 by virtue of the previously mentioned reciprocal tangent relationship. The full desired mooring preload is achieved by a suitable number of the above preloading stages, and the device 1 can be retrieved ultimately from the cable sections by the pendant line 13 when preloading is complete.

By virtue of the slots 9A, 9B in the portion 4, when the chain 17, 18 is taut with link L1 caught in the catch means 6A, there is no substantial chain contact with other portions of the device 1 so that the tensioning device 1 engages the chain 17/18 essentially only on the caught link L1 which is suitably supported to avoid the link being bent. This arrangement mitigates against excessive stress loading occuring in links L2, L3 and L4 and so avoids the chain being damaged by the tensioning device 1 during pretensioning.

Figure 7:
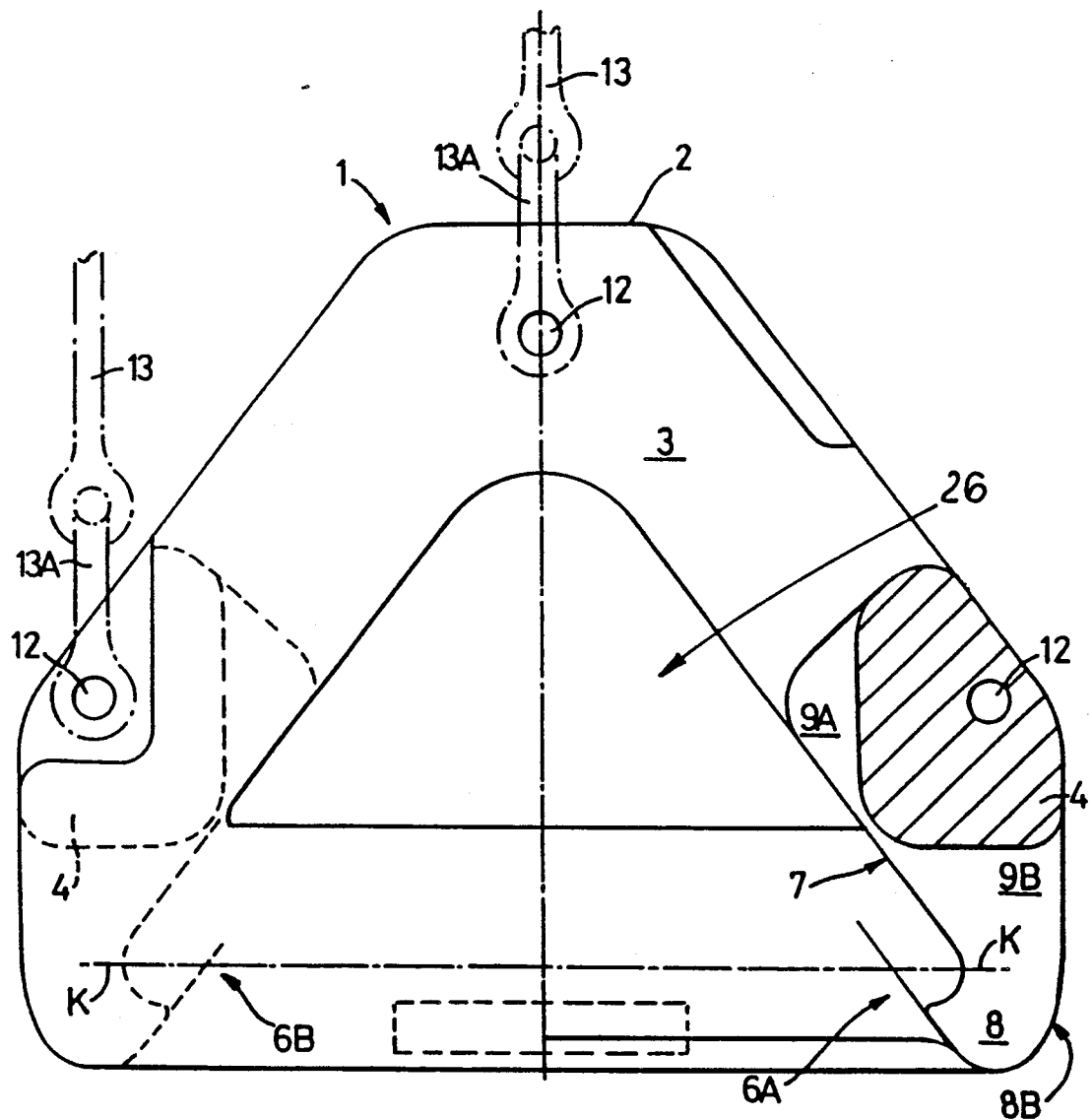
FIG. 7 shows an elevation, in part section, of an anchor chain tensioning device in accordance with another embodiment of the present invention.

The modified form of tensioning device 41 shown in FIG. 7, functions to grab on two chains i.e. the device is double sided, and includes a further chain clutch device 6B replacing the shackle bolt holes 28 of the FIG. 1 device, the clutch device 6B being the mirror image of the clutch device 6A. The device 41 functions similarly to the tensioning device 1 of FIG. 1 but in this case there are two riser chain portions, one connecting with anchor chain 18 and the other with anchor chain 19. Holes 12 for pendant lines 13 are again provided and the device 41 can be removed when pretensioning is complete simply by hauling up on the pendant lines 13. The device 41 is formed by a pair of side plates 3 joined by transverse spacing portions 4 which provide the clutch devices 6A, 6B as before. The connecting line K—K between the catch or clutch devices 6A, 6B is shown in FIG. 7.

More than two anchor cables could be tensioned using either the above tensioning device 1 (or 41) suitably modified or by setting up tensioning apparatus using a plurality of the tensioning devices 1 (41).

I claim:

1. A tensioning device for use in pretensioning at least first and second cables of a mooring line system when the device is attached thereto, at least one of said cables including link chain cable, said tensioning device comprising:

a body member including at least first and second cable holding means, and passage means located between said cable holding means for enabling said one cable including link chain to pass through the body member to define a riser portion, said first and second cable holding means defining a cable holding means connecting line, and said riser portion being selectively movable between a tensioned condition and a relaxed condition, at least one of said cable holding means comprising releasable catch means for engaging said link chain, said releasable catch means being positioned to catch a link of said link chain when the riser portion is tensioned and to release said link when the riser portion is relaxed, said link caught by said catch means being defined as the caught link, the caught link having a downline chain link threading the caught link, and a following link threading the downline chain link, said body member further including slot and clearance means therein for receiving the downline chain link when the caught link is engaged by the releasable catch means during chain tensioning which permits the downline chain link to occupy without obstruction an axial line which forms an angle in the range 0° to 27° with a plane containing said cable holding means connecting line.

2. A tensioning device as claimed in claim 1, wherein the body member includes land surface means for supporting only said caught link of the link chain adjacent said releasable catch means.

3. A tensioning device as claimed in claim 2, wherein said land surface means supports the caught link in a plane inclined at an acute angle to the horizontal when the caught link is engaged by the releasable catch means during chain tensioning, the acute angle facing the axis of the riser portion.

4. A tensioning device as claimed in claim 3, wherein said acute angle of inclination of said plane of support for the caught link lies in the range 30° to 70°.

5. A tensioning device as claimed in claim 2, wherein said caught link has a crown which is remote from the releasable catch means, and wherein said land surface means comprises a support surface which supports the caught link closely adjacent the caught link crown.

6. A tensioning device as claimed in claim 1, wherein the releasable catch means comprises a chain clutch device.

7. A tensioning device as claimed in claim 6, wherein the caught link has a crown, and wherein the chain clutch device includes tooth means for engaging and retaining said crown of the caught link.

8. A tensioning device as claimed in claim 7, wherein said tooth means has an outer surface and a crown, and wherein the outer surface of the tooth means has a portion adjacent to the tooth crown which is inclined at an acute angle to the plane of support for the caught link, whereby chain links bearing on said portion of said outer surface slide clear of the tooth means when the tensioning device falls from the chain on relaxation of the chain tension.

9. A tensioning device as claimed in claim 8, wherein said inclination of said portion of said outer surface of the tooth means to the plane of support for the caught link is in the range 40° to 85°.

10. A tensioning device as claimed in claim 7, wherein the inner surface of the tooth means engaging the caught link crown lies at an angle to the plane of support for the caught link in the range 90° to 120°.

11. A tensioning device as claimed in claim 1, wherein said passage means has a portion in the form of slotted guide means for controlling the orientation of link chain passing therethrough so that a link of the link chain is presented for ready engagement by the releasable catch means.

12. A tensioning device as claimed in claim 11, wherein said slotted guide means has a cruciform cross-section.

13. A tensioning device as claimed in claim 1, wherein the body member includes means for attaching a pendant line positioned such that heaving up on the pendant line trips said releasable catch means out of engagement with the caught link to permit retrieval of the tensioning device.

14. A tensioning device as claimed in claim 1, wherein one of the cable holding means comprises said releasable catch means while the other cable holding means comprises means for pivotally securing a cable to the body member.

15. A tensioning device as claimed in claim 1, wherein at least two of the cable holding means comprise releasable catch means.

16. A tensioning device as claimed in claim 14, wherein means for attaching a pendant line are located on the body member spaced from the extremity of said land surface means remote from said releasable catch means, whereby a lever arm is established which promotes tripping of the releasable catch means out of engagement with the caught link when heaving up on a pendant line attached to said pendant line attaching means.

17. A tensioning device as claimed in claim 1, wherein more than two releasable catch means are present, each for engagement with a respective link chain cable.

18. A tensioning device as claimed in claim 15, wherein means for attaching a pendant line are located in an axis of symmetry of the body member.

* * * * *